Feb. 20, 1934. J. HOJNOWSKI 1,947,908
AEROPLANE
Filed July 20, 1933 3 Sheets-Sheet 1
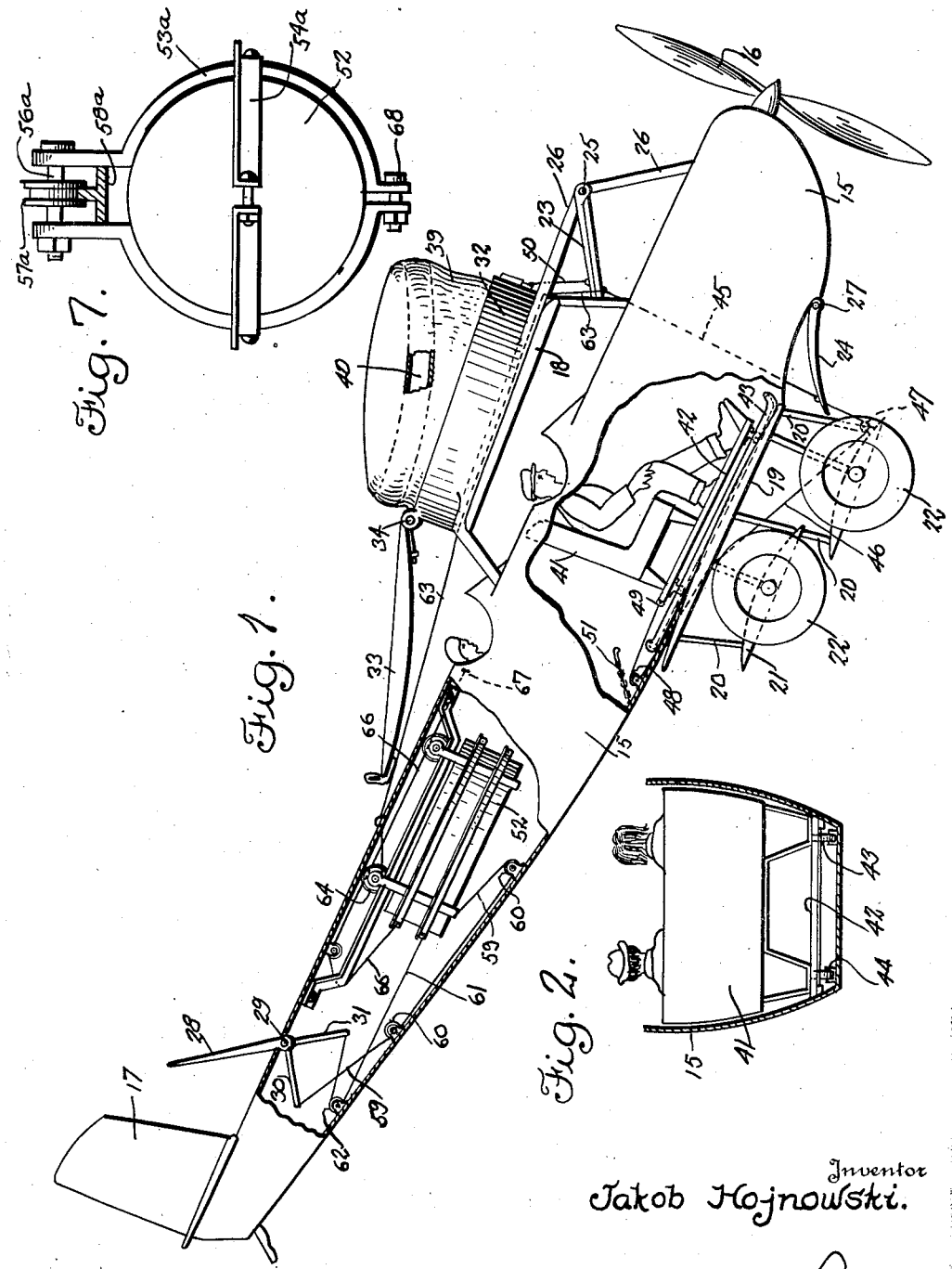
Inventor
Jakob Hojnowski.
By Bryant & Lowry
Attorneys

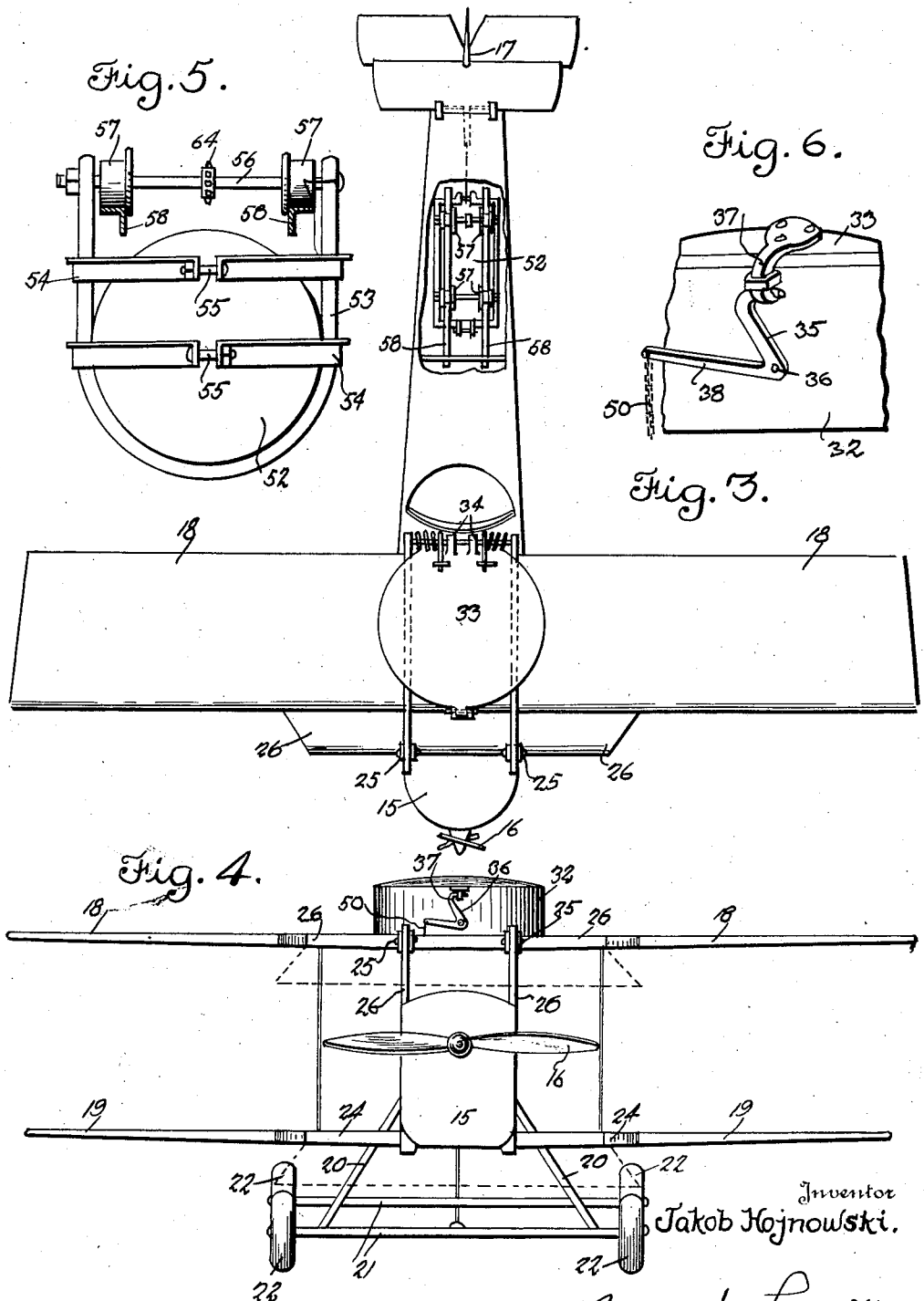

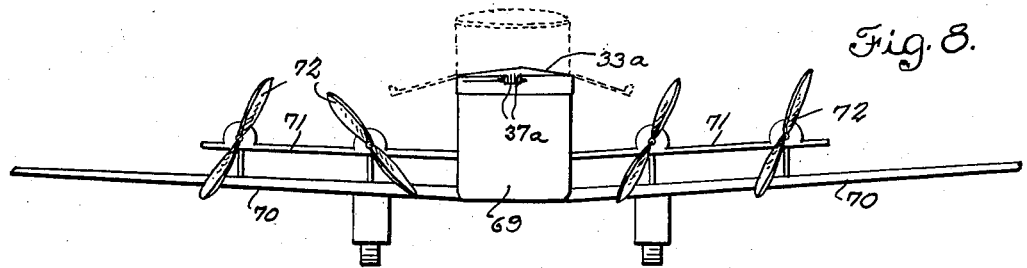
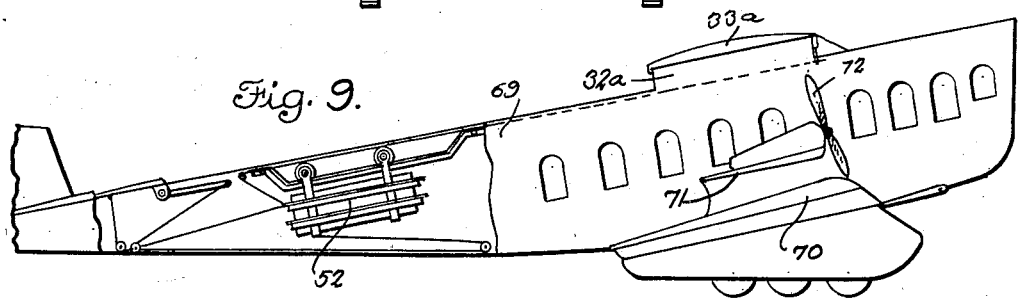
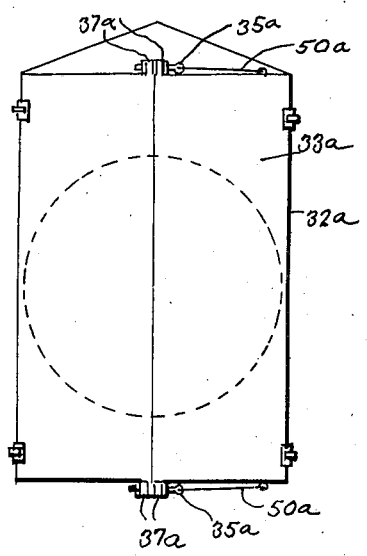
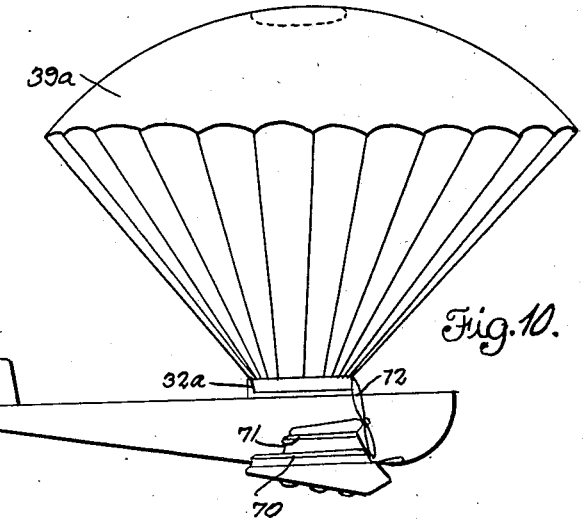
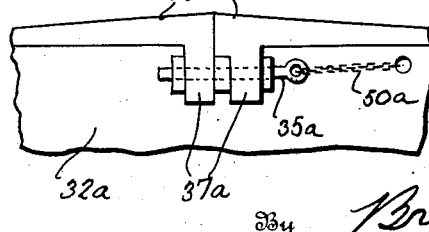

Patented Feb. 20, 1934

1,947,908

UNITED STATES PATENT OFFICE 1,947,908

AEROPLANE

Jakob Hojnowski, Nekoosa, Wis.

Application July 20, 1933. Serial No. 681,341

16 Claims. (Cl. 244—29)

This invention relates to certain new and useful improvements in aeroplanes.

The primary object of the invention is to provide improved means for preventing nose dives in aeroplanes and for restoration of equilibrium of the aeroplane during flight, the devices being automatically operable by movement of a passenger seat or carriage slidably mounted in the fuselage of the aeroplane.

It is a further object of the invention to embody in an aeroplane of the foregoing character, a parachute attachment normally confined and automatically released should the aeroplane enter a nose dive.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a side elevational view, partly broken away and shown in section of an aeroplane constructed in accordance with the present invention and equipped with devices for bringing the aeroplane out of a nose dive, the parachute attachment being illustrated as in its partially released position;

Figure 2 is a fragmentary cross-sectional view showing the shiftably mounted passenger seat or carriage;

Figure 3 is a top plan view partly broken away to illustrate the shiftably mounted weight or gas tank for the automatic operation of the safety devices;

Figure 4 is a front elevational view with the wing extension illustrated by dotted lines in lowered position;

Figure 5 is a detail view, partly in section showing the shiftably mounted weight or gas tank operating upon a pair of guide rails for the operation of the safety devices;

Figure 6 is a detail view showing the latch device for the cover of the parachute casing;

Figure 7 is a detail view, partly in section showing another form of single rail mounting for the shiftable weight or gas tank;

Figure 8 is a front elevational view of a hydroplane equipped with the safety devices and provided with a plurality of motors;

Figure 9 is a side elevational view of the hydroplane shown in Figure 8, partly broken away to illustrate the shiftable gas tank;

Figure 10 is a side elevational view of the hydroplane with the parachute in fully extended position;

Figure 11 is a top plan view of a rectangular casing provided with a pair of hinged cover sections for housing the parachute; and Figure 12 is a fragmentary end elevational view of the parachute casing shown in Figure 11.

Referring more in detail to the accompanying drawings and particularly to Figures 1 to 6, there is illustrated an aeroplane comprising a fuselage 15 provided with the usual forwardly positioned propeller 16, the empenage devices 17 and upper and lower wings 18 and 19 respectively. The landing gear includes depending struts 20 carrying transversely extending axle plates 21 of stream line formation equipped upon opposite ends with ground wheels 22.

The safety devices include hinged forwardly positioned wing sections 23 and 24 respectively associated with the forward edges of the upper and lower wings 18 and 19, the upper hinged wing section 22 being hingedly mounted at its forward edge as at 25 upon a frame work 26 while the lower wing section 24 is hingedly mounted as at 27 to the underside of the forward end of the fuselage 15. The wing sections 23 and 24 normally complete the stream line formation of the main wings 18 and 19. An elevator 28 is hingedly mounted as at 29 to the upper side of the fuselage 15 adjacent the rear end thereof substantially in the plane of the upper side of the fuselage and carries a pair of angularly disposed angle irons 30 and 31 extending into the interior of the fuselage 15.

Another safety feature includes a parachute attachment embodying a cylindrical casing 32 carried centrally of the upper wing 18 and provided with a cover 33 hinged thereto as at 34 and normally retained in closed position on the casing 32 as illustrated in Figure 6 by means of a latch 35 pivotally mounted as at 36 upon the side wall of the casing and engaged with a keeper 37 carried by the cover 33. The latch 35 carrying an operating arm 38 to be moved by devices presently to be described. The parachute includes a bag 39 anchored within the casing by means of the usual ropes or cables and carrying centrally thereof a tank 40 charged with lighter than air gas to aid in the suspension of the aeroplane in the event of accident or the like.

The operating means for the forwardly positioned wing extensions 23 and 24 includes a passenger carriage or seat 41 slidably mounted in the forward end of the fuselage 15, the carriage 41 including a seat portion mounted upon a platform 42 having rollers 43 upon its underside guided in trackways 44. The upper and lower wing extensions 23 and 24 are connected together at their rear free swinging edges by a cable 45 and the rear free swinging edge of the lower wing extension 24 has a cable connection 46 passing over guide rollers 47 and 48, the latter being mounted within the fuselage rearwardly of the trackways 43 with the other end of the cable 46 attached as at 49 to the rear end of the platform 42 carrying the passenger carriage 41. It will therefore be seen that when the aeroplane enters a nose dive, the passenger carriage 41 slides forwardly and downwardly in the trackways 43 for the operation of the cable 46 and opening movement of the hinged wing extensions 23 and 24 for moving them into the positions shown in Figure 1.

Movement of the wing extensions 23 and 24 also effects the release of the latch 35 from the keeper 37 to permit opening movement of the cover 33 for the casing 32 that houses the parachute 39, the latch arm 38 having a cable connection 50 as shown in Figures 1 and 6 with the rear free swinging edge of the upper wing extension 23, the parachute 39 being automatically released from the casing 32 for expansion thereof into operative position. In ordinary flight, the platform 42 and passenger carriage 41 are restrained from movement by means of the anchor chain and hook 51 shown in Figure 1 that is anchored to the fuselage 15 and detachably engaged with a part of the sliding platform 42.

The operating means for the elevator 28 which also acts to restore the hinged wing extensions 23 and 24 to their inoperative positions, comprises a slidably mounted weight 52 which may constitute the fuel tank for the aeroplane motor, the tank and supporting cradle therefor being more clearly shown in Figures 1 and 5, the supporting cradle for the tank 52 including U-shaped hanger straps 53 within which the tank 52 is set and spaced longitudinally extending frame bars 54 bent at opposite ends to overlie the ends of the tank 52 and connected together by bolt and nut combinations 55. The upper ends of the U-shaped strap hangers 53 of the cradle, each carry a cross shaft 56 upon which a pair of track wheels 57 are freely rotatable, the track wheels 57 being engaged with the track rails 58, supported by and depending from the upper wall of the fuselage 15, adjacent the rear end thereof and rearwardly of the pilot and passenger section of the aeroplane. The rear end of the tank 52 has a cable connection 59 with the angle arm 30 of the elevator 28, the cable 59 passing over guide rollers 60 within the fuselage 15. The angle arm 31 of the elevator 28 also has a cable connection 61 with the rear end of the tank 52, this cable passing over a guide roller 62. A cable 63 is attached at one end to the wheel 64 carried by the rearwardly disposed cross-shaft 56 of the tank cradle, the other end of the cable 63 extending forwardly for attachment to the upper hinged wing section 23. When the aeroplane tilts forwardly and downwardly as in entering a nose dive, the tank 52 moves forwardly and downwardly releasing tension on the cable 63 to permit operation of the cable 45 by the passenger carriage 41 for effecting movement of the hinged wing sections 23 and 24 and said movement of the tank 52 imparts a pulling strain on the cable 61 and relieves strain on the cable 69 for raising the elevator 28, the wing sections 23 and 24 and the elevator 28 then acting to bring the aeroplane out of a nose dive.

In normal flight, the tank 52 is restrained from movement by means of the cable 66 that leads to the cockpit of the aeroplane as at 67 under control of the pilot.

Another form of cradle for the support of the tank 52 is shown in Figure 7, this cradle comprising pairs of strap members 53a embracing opposite sides of the tank 52, connected together at their lower ends by a bolt and nut combination 68 and connected at their upper ends by a cross-shaft 56a upon which a single track wheel 57a is freely rotatable for riding on the single track rail 58a. The cradle may further embody a single horizontally disposed frame member 54a.

In the form of invention illustrated in Figures 8 to 12, the safety features are embodied in a hydroplane embodying a fuselage 69 carrying a single wing 70 upon which a frame structure 71 is superposed for the support of a plurality of motor operated propellers 72. The gas tank 52 and cradle support therefor is the same as shown in Figure 1, the casing 32a for housing the parachute 39a being of rectangular form and embodying a pair of hinged cover sections 33a retained in closed position by a latch bolt 35a engaged with keeper lugs 37a on the cover sections, the latch bolt 35a being operated by a cable 50a, a latch bolt and its operating mechanism being associated with each end of the casing 32a as shown in Figure 11.

From the above detailed description of the invention, it is believed that the construction and operation thereof will at once be apparent and while there are herein shown and described the preferred embodiments of the invention, it is nevertheless to be understood that minor changes may be made therein without departing from the spirit and scope of the invention as claimed.

I claim:—

1. In an aeroplane, a fuselage, a pair of wings on the fuselage, a dive controlling extension at the forward edge of each wing, a cable connecting the extensions, an elevator at the rear of the fuselage, a track in the fuselage extending longitudinally thereof, a wheeled weight running on the track, a slidable passenger carriage in the fuselage, a cable connection between the carriage and the lower wing extension and cable connections between the wheeled weight and elevator.

2. In an aeroplane, a fuselage, a pair of wings on the fuselage, a dive controlling extension at the forward edge of each wing, a cable connecting the extensions, an elevator at the rear of the fuselage, a track in the fuselage extending longitudinally thereof, a wheeled weight running on the track, a slidable passenger carriage in the fuselage, a cable connection between the carriage and the lower wing extension and cable connections between the wheeled weight and elevator, and a cable connection between the wheeled weight and the upper wing extension.

3. In an aeroplane, a fuselage, a pair of wings on the fuselage, a dive controlling extension at the forward edge of each wing, a cable connecting the extensions, an elevator at the rear of the fuselage, a track in the fuselage extending longitudinally thereof, a wheel weight running on the track, a slidable passenger carriage in the fuselage, a cable connection between the carriage and the lower wing extension and cable connections between the wheeled weight and elevator, a casing on the areoplane having a hinged cover, a parachute confined in the casing and a latch for the cover having a cable connection with the upper wing extension.

4. In an aeroplane, a fuselage, a pair of wings on the fuselage, a dive controlling extension at the forward edge of each wing, a cable connecting the extensions, an elevator at the rear of the fuselage, a track in the fuselage extending longitudinally thereof, a wheeled weight running on the track, a slidable passenger carriage in the fuselage, a cable connection between the carriage and the lower wing extension and cable connections between the wheeled weight and elevator, and a cable connection between the wheeled weight and the upper wing extension, a casing on the aeroplane having a hinged cover, a parachute confined in the casing and a latch for the cover having a cable connection with the upper wing extension.

5. In an aeroplane, a fuselage, a pair of wings on the fuselage, a dive controlling extension at the forward edge of each wing, a cable connecting the extensions, an elevator at the rear of the fuselage, a track in the fuselage extending longitudinally thereof, a wheeled weight running on the track, a slidable passenger carriage in the fuselage, a cable connection between the carriage and the lower wing extension and cable connections between the wheeled weight and elevator, and a cable connection between the wheeled weight and upper wing extensions for moving the wing extensions to inoperative positions upon rearward sliding movements of the wheeled weight.

6. In an aeroplane, a fuselage, a pair of wings on the fuselage, a dive controlling extension at the forward edge of each wing, a cable connecting the extensions, an elevator at the rear of the fuselage, a track in the fuselage extending longitudinally thereof, a wheeled weight running on the track, a slidable passenger carriage in the fuselage, a cable connection between the carriage and the lower wing extension and cable connections between the wheeled weight and elevator, and a cable connection between the wheeled weight and the upper wing extension, and a cable connection between the wheeled weight and upper wing extensions for moving the wing extensions to inoperative positions upon rearward sliding movements of the wheeled weight.

7. In an aeroplane, a fuselage, a pair of wings on the fuselage, a dive controlling extension at the forward edge of each wing, a cable connecting the extensions, an elevator at the rear of the fuselage, a track in the fuselage extending longitudinally thereof, a wheeled weight running on the track, a slidable passenger carriage in the fuselage, a cable connection between the carriage and the lower wing extension and cable connections between the wheeled weight and elevator, a casing on the aeroplane having a hinged cover, a parachute confined in the casing and a latch for the cover having a cable connection with the upper wing extension, and a cable connection between the wheeled weight and upper wing extensions for moving the wing extensions to inoperative positions upon rearward sliding movements of the wheeled weight.

8. In an aeroplane, a fuselage, a pair of wings on the fuselage, a dive controlling extension at the forward edge of each wing, a cable connecting the extensions, an elevator at the rear of the fuselage, a track in the fuselage extending longitudinally thereof, a wheeled weight running on the track, a slidable passenger carriage in the fuselage, a cable connection between the carriage and the lower wing extension and cable connections between the wheeled weight and elevator, and a cable connection between the wheeled weight and the upper wing extension, a casing on the aeroplane having a hinged cover, a parachute confined in the casing and a latch for the cover having a cable connection with the upper wing extension, and a cable connection between the wheeled weight and upper wing extension for moving the wing extensions to inoperative positions upon rearward sliding movements of the wheeled weight.

9. In an aeroplane, a fuselage, a pair of wings on the fuselage, a dive controlling extension at the forward edge of each wing, a cable connecting the extensions, an elevator at the rear of the fuselage, a track in the fuselage extending longitudinally thereof, a wheeled weight running on the track, a slidable passenger carriage in the fuselage, a cable connection between the carriage and the lower wing extension and cable connections between the wheeled weight and elevator, and a cable connection between the wheeled weight and upper wing extensions for moving the wing extensions to inoperative positions upon rearward sliding movements of the wheeled weight, and independent means for holding the passenger carriage and wheeled weight against movement.

10. In an aeroplane, a fuselage, a pair of wings on the fuselage, a dive controlling extension at the forward edge of each wing, a cable connecting the extensions, an elevator at the rear of the fuselage, a track in the fuselage extending longitudinally thereof, a wheeled weight running on the track, a slidable passenger carriage in the fuselage, a cable connection between the carriage and the lower wing extension and cable connections between the wheeled weight and elevator, and a cable connection between the wheeled weight and upper wing extensions for moving the wing extensions to inoperative positions upon rearward sliding movements of the wheeled weight, and independent means for holding the passenger carriage and wheeled weight against movement.

11. In an aeroplane, a fuselage, a pair of wings on the fuselage, a dive controlling extension at the forward edge of each wing, a cable connecting the extensions, an elevator at the rear of the fuselage, a track in the fuselage extending longitudinally thereof, a wheeled weight running on the track, a slidable passenger carriage in the fuselage, a cable connection between the carriage and the lower wing extension and cable connections between the wheeled weight and elevator, a casing on the aeroplane having a hinged cover, a parachute confined in the casing and a latch for the cover having a cable connection with the upper wing extension, and a cable connection between the wheeled weight and upper wing extensions for moving the wing extensions to inoperative positions upon rearward sliding movements of the wheeled weight, and independent means for holding the passenger carriage and wheeled weight against movement.

12. In an aeroplane, a fuselage, a pair of wings on the fuselage, a dive controlling extension at the forward edge of each wing, a cable connecting the extensions, an elevator at the rear of the fuselage, a track in the fuselage extending longitudinally thereof, a wheeled weight running on the track, a slidable passenger carriage in the fuselage, a cable connection between the carriage and the lower wing extension and cable connections between the wheeled weight and elevator, and a cable connection between the wheeled weight and the upper wing extension, a casing on the aeroplane having a hinged cover, a parachute confined in the casing and a latch for the cover having a cable connection with the upper wing extension, and a cable connection between the wheeled weight and upper wing extension for moving the wing extensions to inoperative positions upon rearward sliding movements of the wheeled weight, and independent means for holding the passenger carriage and wheeled weight against movement.

13. In an aeroplane, a fuselage, a pair of wings on the fuselage, a dive controlling extension at the forward edge of each wing, a cable connecting the extensions, an elevator at the rear of the fuselage, a track in the fuselage extending longitudinally thereof, a wheeled weight running on the track, a slidable passenger carriage in the fuselage, a cable connection between the carriage and the lower wing extension and cable connections between the wheeled weight and elevator, a casing on the aeroplane having a hinged cover, a parachute confined in the casing and a latch for the cover having a cable connection with the upper wing extension, and a gas tank at the upper end of the bag of the parachute.

14. In an aeroplane, a fuselage, a pair of wings on the fuselage, a dive controlling extension at the forward edge of each wing, a cable connecting the extensions, an elevator at the rear of the fuselage, a track in the fuselage extending longitudinally thereof, a wheeled weight running on the track, a slidable passenger carriage in the fuselage, a cable connection between the carriage and the lower wing extension and cable connections between the wheeled weight and elevator, and a cable connection between the wheeled weight and the upper wing extension, a casing on the aeroplane having a hinged cover, a parachute confined in the casing and a latch for the cover having a cable connection with the upper ring extension, and a gas tank at the upper end of the bag of the parachute.

15. In an aeroplane, a fuselage, a pair of wings on the fuselage, a dive controlling extension at the forward edge of each wing, a cable connecting the extensions, an elevator at the rear of the fuselage, a track in the fuselage extending longitudinally thereof, a wheeled weight running on the track, a slidable passenger carriage in the fuselage, a cable connection between the carriage and the lower wing extension, cable connections between the wheeled weight and elevator, and a landing gear including ground wheel axles of stream-line formation.

16. In an aeroplane, a fuselage, a pair of wings on the fuselage, a dive controlling extension at the forward edge of each wing, a cable connecting the extensions, an elevator at the rear of the fuselage, a track in the fuselage extending longitudinally thereof, a wheeled weight running on the track, a slidable passenger carriage in the fuselage, a cable connection between the carriage and the lower wing extension, cable connections between the wheeled weight and elevator, a cable connection between the wheeled weight and the upper wing extension, and a landing gear including ground wheel axles of stream line formation.

JAKOB HOJNOWSKI.